June 29, 1943.  W. H. PERKINS  2,322,955
CURRENT SUPPLY SYSTEM
Filed Jan. 11, 1941  3 Sheets-Sheet 1
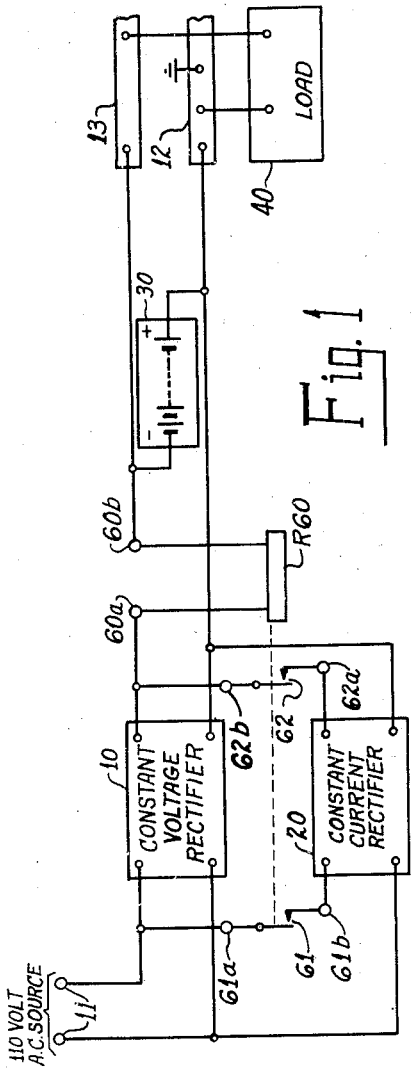
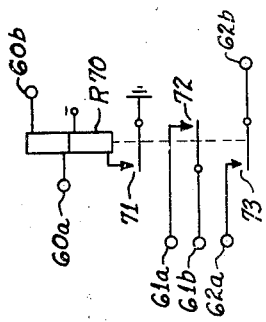
INVENTOR.
WILLIAM H. PERKINS
BY Davis, Lindsey, Smith & Shonts
ATTORNEYS.

June 29, 1943.  W. H. PERKINS  2,322,955
CURRENT SUPPLY SYSTEM
Filed Jan. 11, 1941  3 Sheets-Sheet 2
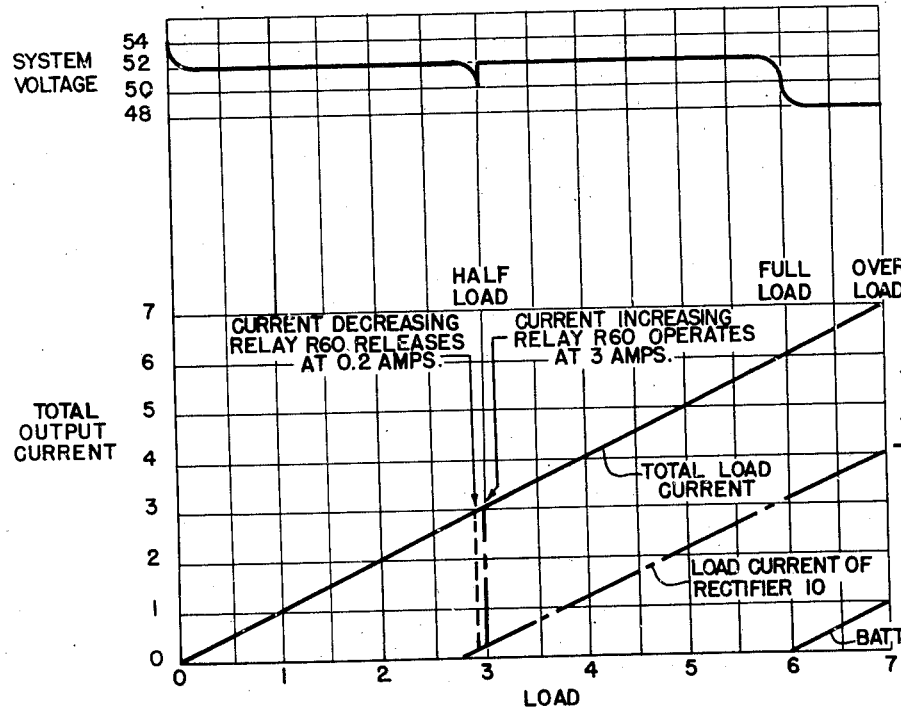
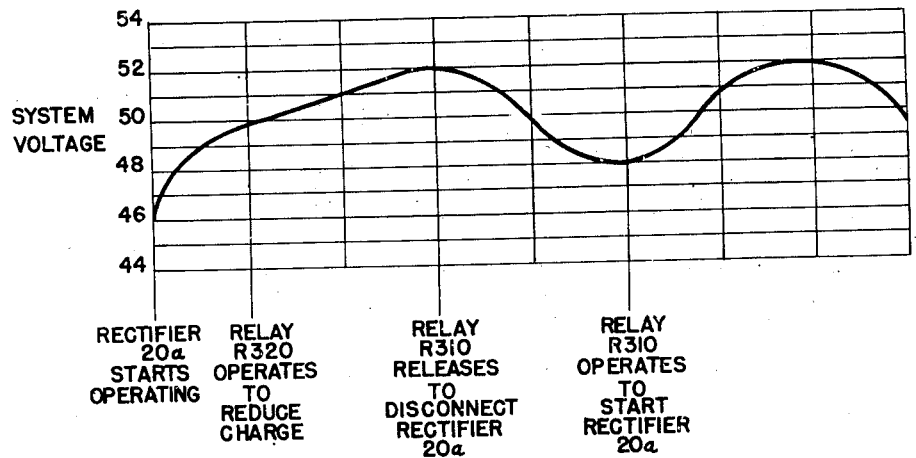
INVENTOR.
WILLIAM H. PERKINS
BY Davis, Lindsey, Smith & Shonts
ATTORNEYS.

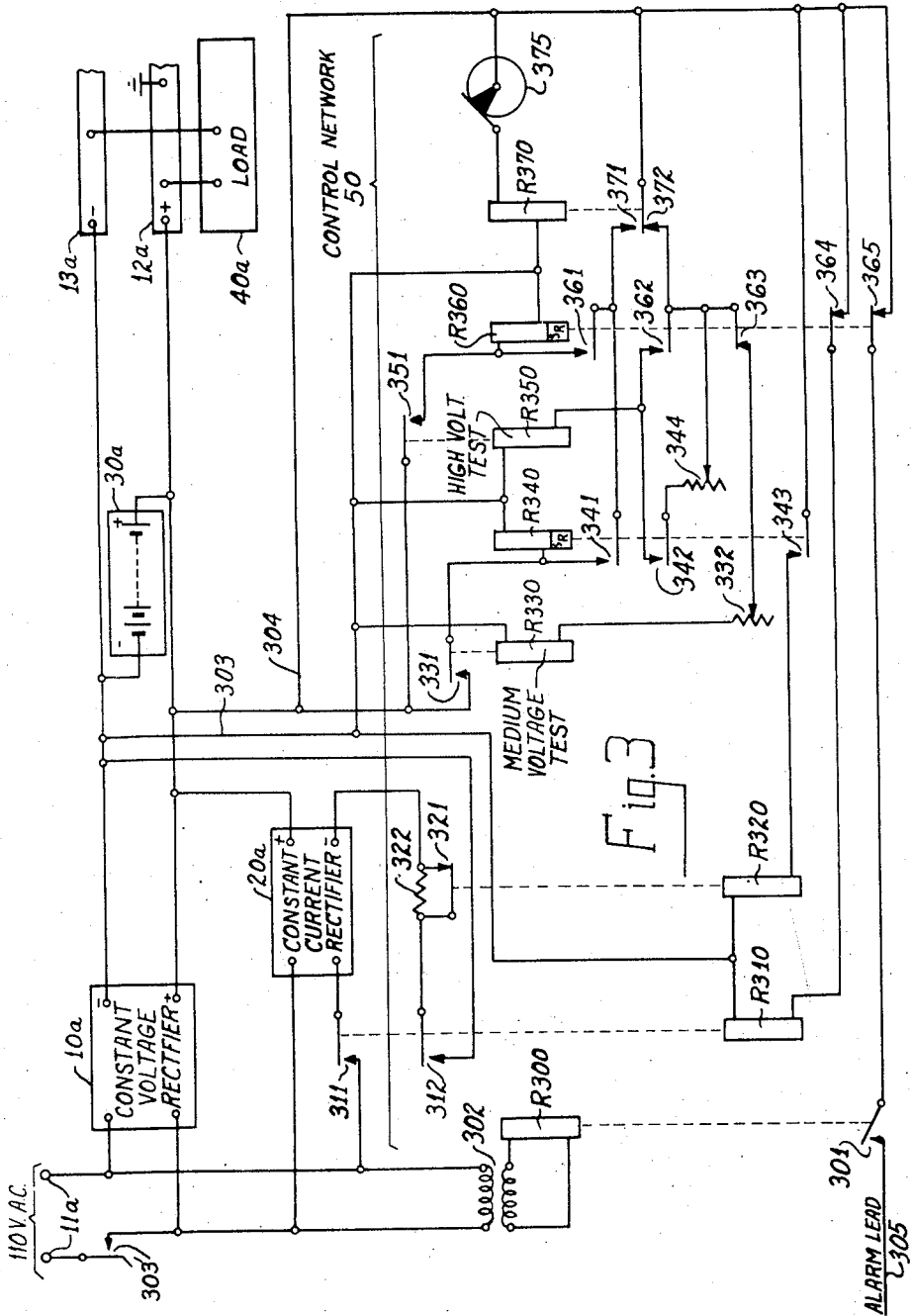

Patented June 29, 1943

2,322,955

UNITED STATES PATENT OFFICE 2,322,955

CURRENT SUPPLY SYSTEM

William H. Perkins, Oak Park, Ill., assignor to Associated Electric Laboratories, Inc., Chicago, Ill., a corporation of Delaware Application January 11, 1941, Serial No. 374,058

22 Claims. (Cl. 171—314)

The present invention relates to current supply systems and, more particularly, to improvements in supply systems of the character utilized in automatic telephone exchanges to supply direct current to the various control relays, operating magnets and other control elements of the automatic switchgear.

Current supply systems adapted for use in installations of the type mentioned conventionally include a unit which functions to convert ordinary commercial alternating current into direct current of the proper voltage, and a storage battery which is connected across the main current bus conductors and serves as an emergency supply source in case of commercial power failure and also to supply current during peak traffic periods when the current demand exceeds the current rating of the converter unit. In small unattended exchanges it is desirable to use rectifiers of the thermionic or dry disk types as the converter units. Such rectifiers have, in the arrangements known to the prior art, been of the constant voltage type and also of the constant current type, but not a combination of the two types. The characteristics of a constant voltage rectifier are such that the output voltage is maintained substantially constant, regardless of the output current, so long as the rated current of the rectifier is not exceeded. This characteristic is extremely desirable in an application of the character mentioned since it contributes to a uniform system voltage regardless of load, and, hence, materially enhances the life of the battery and improves the performance of the telephone switchgear. A rectifier of this type is open to the criticism that it is relatively inefficient, particularly at light loads. Hence, from the standpoint of operating cost, it is not good practice to provide a constant voltage rectifier of sufficient capacity to supply the current demand under peak traffic conditions. The constant current type of rectifier, on the other hand, is relatively much more efficient than the constant voltage type of rectifier, but is open to the criticism that its output voltage fluctuates considerably with changes in load current. The resulting fluctuations of the system voltage contribute materially to the deterioration of the system battery.

It is an object of the present invention, therefore, to provide a current supply system of the character described, wherein rectifiers of the constant voltage and constant current types are used in combination and are so controlled that maximum system efficiency is obtained at all loads, with minimum fluctuation in the system voltage.

It is another object of the invention to provide a system of the character indicated, wherein the constant voltage rectifier is at all times included in the power supply channel and the constant current rectifier is automatically switched into and out of the supply channel in accordance with the magnitude of the load imposed on the system.

It is a further object of the invention to provide a system of the character described, wherein the constant current rectifier is automatically switched into and out of the power supply channel in accordance with predetermined changes in the system voltage.

It is another object of the invention to provide a system of the character noted, wherein the inclusion of the constant current rectifier in the current supply channel is under the control of testing apparatus which functions periodically to test the system voltage.

It is still another object of the invention to provide a system of the character indicated, which is so arranged that the magnitude of the current supplied by the constant current rectifier is automatically changed under the control of the testing apparatus in accordance with changes in the system voltage.

It is a further object of the invention to provide a battery charging system wherein the charging circuit is controlled by apparatus which functions periodically to test the voltage of the battery.

In each of the two illustrated embodiments of the invention there is provided a system comprising a constant voltage rectifier which is operative to deliver current to the load at all times. A second normally inactive rectifier of the constant current type is provided. The system also includes control means which functions automatically to shift the load to the constant current rectifier when the load imposed on the system rises to a predetermined value. This is accomplished by connecting the constant current rectifier in parallel with the constant voltage rectifier, the characteristics of the two rectifiers being such that when connected in parallel the major portion of the load is carried by the constant current rectifier until the load current delivered thereby is equal to the current rating of this rectifier, at which time the added load is imposed upon the constant voltage rectifier. In one embodiment of the invention the inclusion of the constant current rectifier in the current supply channel is under the control of a marginal current responsive relay which is included in one side of the output circuit of the constant voltage rectifier. In the other illustrated embodiment of the invention the control apparatus provided to control the output circuit of the constant current rectifier comprises testing means which functions intermittently to test the system voltage. More specifically, this testing means is so arranged that when a test indicates that the system voltage is low, either due to a heavy load imposed on the system or to a discharged condition of the system battery, the constant current rectifier is connected in parallel with the constant voltage rectifier. If thereafter a succeeding test indicates that the voltage of the system has risen substantially to normal, the output current of the constant current rectifier is automatically reduced to effect a taper charge of the system battery. If a subsequent voltage test indicates that the system battery is fully charged, or that the load on the system is low, the constant current rectifier is automatically excluded from the current supply channel.

The arrangement briefly described above is of particular utility in increasing the load current capacity of a current supply system provided in an exchange wherein the addition of switchgear is required in order to handle increased traffic. Thus if an existing exchange is equipped with a power supply system utilizing a constant voltage rectifier, the current capacity of the system may be increased with an increase in overall efficiency by providing, in accordance with the present invention, a relatively small constant current rectifier as against the alternative of installing a larger, less efficient, and more expensive rectifier unit of the constant voltage type. Similarly, if the existing installation includes a current supply system utilizing a rectifier of the constant current type, better system voltage regulation accompanied with substantially the same efficiency may be obtained at a lesser initial cost by the addition of a small capacity constant voltage rectifier.

The novel features believed to be characteristic of the invention are set forth with particularity in the appended claims. The invention, both as to its organization and method of operation, together with further objects and advantages thereof, will best be understood by reference to the specification taken in connection with the accompanying drawings in which Fig. 1 illustrates one embodiment of the invention; Fig. 1a illustrates certain modifications which may be incorporated in the system shown in Fig. 1; Fig. 2 illustrates certain of the characteristics of the system shown in Fig. 1; Fig. 3 illustrates a second embodiment of the invention; and Fig. 4 illustrates certain of the operating characteristics of the system shown in Fig. 3.

Referring now more particularly to Fig. 1 of the drawings, the current supply system there illustrated comprises a constant voltage rectifier 10, which is arranged to deliver direct current to a load 40 and also functions to charge the system battery 30. The input terminals of the rectifier 10 are connected to the current supply terminals 11 which terminate opposite sides of a 110 volt alternating current feeder circuit. More specifically, the storage battery 30 is normally floated across the system bus conductors 12 and 13 from which branch circuits extend to the component control elements constituting the load 40. In accordance with well established telephone engineering practice, the positive bus conductor 12 is connected to ground. It will be understood that the load 40 is comprised of a large number of relay and magnet windings, lamps and other control elements, but for convenience in explaining the operation of the system these elements may be lumped together and considered as a load of variable resistance. The battery 30 is of the type conventionally used in telephone practice and may comprise twenty-four cells having a terminal voltage varying between 46 to 54 volts, depending upon the state of charge thereof and the load imposed thereon. This battery is utilized as a current reservoir for supplying current over the bus conductors 12 and 13 to the load 40 during periods of failure of the commercial current source. The battery source may also be utilized to supply current to the load 40 during peak load periods.

The system also includes a constant current rectifier 20 having the characteristic of supplying an output current of constant magnitude regardless of the load imposed thereon. For the purpose of automatically including the constant current rectifier 20 in the current supply channel when the load imposed on the system rises to a predetermined value, a current responsive relay R60 is provided which is included in the negative side of the output circuit of the constant voltage rectifier 10. Assuming that the current rating of the system is between 5.5 and 6 amperes, the current rating of the constant voltage rectifier 10 is 3 amperes, and the constant current rectifier 20 is adjusted to deliver approximately 2.7 amperes, the relay R60 may be constructed to operate when the current supply to the load 40 reaches a value of 3 amperes, and, having operated, to release when the current flow therethrough falls to a value of 0.2 ampere. Since constant voltage rectifiers and constant current rectifiers are well known in the art, the details of the two rectifier units 10 and 20 have not been illustrated in the drawings. It is noted, however, that these rectifiers may be either of the dry disk or thermionic type.

The operation of the system illustrated in Fig. 1 of the drawings will best be understood by reference to the operating characteristics shown in Fig. 2 of the drawings. From these characteristics it will be observed that the normal open-circuit voltage of the system with the battery 30 fully charged is approximately 54 volts. When, however, a load is imposed upon the system the voltage drops to approximately 52 volts. So long as the load current does not exceed 3 amperes, representing approximately half load, the load current is supplied solely by the constant voltage rectifier 10, the constant current rectifier 20 remaining inactive. Due to the action of the rectifier 10, the system voltage is held substantially constant at a value of 52 volts until the load current rises to approximately 2.8 amperes when it starts to drop. When the load current rises to 3 amperes the current responsive relay R60, which is traversed by the load current, operates and closes its contacts 61 to connect the input terminals of the constant current rectifier 20 to the alternating current supply terminals 11. At its contacts 62, the relay R60 connects the output terminals of the constant current rectifier 20 to the bus conductors 12 and 13, respectively. Thus, following operation of the relay R60, the two rectifiers 10 and 20 are connected in parallel. Incident to this switching operation, the system voltage is again raised to a value of approximately 52 volts. The constant current rectifier 20 being adjusted to deliver 2.7 amperes now assumes 90 percent of the entire load, the remaining 10 percent of the load current being delivered by the rectifier 10. If the load continues to rise, the constant current rectifier 20 supplies its rated current of 2.7 amperes and the excess load is carried by the constant voltage rectifier 10. When, however, the load current approaches the combined rated current capacities of the two rectifiers 10 and 20, the system voltage starts to decrease. As the load current starts to exceed the combined current ratings of the two rectifiers, the system voltage drops to a value of 48 volts. At this point, the system voltage is stabilized by the action of the battery. Also, the current demands in excess of the combined current ratings of the two rectifiers 10 and 20 are supplied by the battery 30.

With decreasing load current, the constant current rectifier 20 continues to carry the major portion of the load until the current traversing the winding of the relay R60 is reduced to approximately 0.2 ampere, at which point the relay R60 releases. In releasing, the relay R60 opens its contacts 61 and 62 to exclude the constant current rectifier 20 from the current supply channel. Incident to this switching operation the relay R60 transfers the entire load to the constant voltage rectifier 10. It will thus be apparent that the current responsive relay R60 operates automatically to switch the constant current rectifier 20 into and out of the current supply channel in accordance with changes in the load imposed upon the system. The load changes may either be due to a decrease in load resistance, occasioned by the connection of a large number of relay and magnet windings in parallel at the same time, or may be due to an uncharged condition of the battery 30 following a failure of the commercial current source. In either case the current requirements are met in a most efficient manner through operation of the constant voltage rectifier 10 alone, or concurrent operation of this rectifier and the constant current rectifier 20. Moreover, the action of the constant voltage rectifier 10 serves to maintain the system voltage substantially constant even when the constant current rectifier 20 is included in the system, so long as the load demands do not exceed the combined current ratings of the two rectifiers. It will also be noted that the relay R60 only operates to include the constant current rectifier 20 in the current supply channel when the load current demands exceed the output current the rectifier is adjusted to deliver, i. e. 2.7 amperes. At lighter loads the current is supplied solely by the constant voltage rectifier 10. By virtue of this arrangement, the possibility of the constant current rectifier 10 overcharging the battery at light loads is obviated.

Referring now to Fig. 1a of the drawings, there is illustrated a modified arrangement of the relay which functions to switch the constant current rectifier 20 into and out of the current supply channel. In this arrangement the relay R70 is provided with an upper winding which may be substituted for the winding of the relay R60 between the terminals 60a and 60b in the negtive supply lead of the constant voltage rectifier 10. The contacts 72 may be utilized to control the input circuit to the rectifier 20 and the contacts 73 may be utilized to control the output circuit of this rectifier. This relay is provided with a lower winding which functions as a holding winding and is energized in an obvious manner from the bus conductors 12 and 13 through the contacts 71, following operation of the relay. The number of turns and resistance of the lower winding embodied in the relay R70 may be so proportioned that this relay will release when current of any predetermined low value traverses the upper winding of this relay. In other words, current flow through both windings is necessary to sustain the relay R70 in its operated position and the relay is adjusted to release at any desired value of current flow through its upper winding by suitably proportioning the turns and resistance of its lower winding. This arrangement constitutes a simple expedient whereby the constant current rectifier 20 may automatically be switched into and out of the current supply channel without resorting to an expensive relay construction.

Referring now, more particularly, to Fig. 3 of the drawings, the current supply system there illustrated is essentially similar to that shown in Fig. 1, with the exception of the arrangement of the apparatus for switching the constant current rectifier 20a into and out of the current supply channel. In order to indicate the similarity of the two systems, corresponding elements thereof have been identified by the same reference numerals. In the arrangement illustrated in Fig. 3, a control network 50 is provided for switching the constant current rectifier 20a into and out of the current supply channel and for regulating the amount of current delivered to the load from this rectifier, all in response to predetermined changes in the system voltage, i. e. the voltage across the main current bus conductors 12a and 13a. Briefly considered, this control network comprises an alarm relay R300 of the alternating current type, which is normally energized from the available commercial current feeder circuit through a suitable voltage step-down transformer 302. The control network further includes a switching relay R310, a current control relay R320, a medium voltage test relay R330, a high voltage test relay R350, a pulsing relay R370 and a pair of slow-to-release control relays R340 and R360. The network further includes a pulsing or commutating element 375, which is preferably driven by a synchronous motor, and functions periodically to transmit current pulses to the pulsing relay R370. Preferably, the speed of the pulsing element 375 is so constructed that the operating circuit for the pulsing relay R370 is opened for ten-second test periods at regular intervals of two minutes. For the purpose of connecting the input terminals of the rectifying units to the commercial current source, a manually operable switch 303' may be provided in the commercial current feeder circuit.

In considering the operation of the system shown in Fig. 3 of the drawings, it may be assumed that the normal open circuit voltage of the system battery 30a is from 48 to 50 volts; that the total load current rating of the system is from 5.5 to 6 amperes, and that the rated full-load output current of each of the two rectifiers 10a and 20a is 3 amperes. It may also be assumed that the no-load voltage rating of the constant voltage rectifier 10a is approximately 52 volts. Assuming that the system characteristics are as stated above, the operation of the control network 50 may best be explained by reference to the operating curve illustrated in Fig. 4 of the drawings.

With the system voltage below 48 volts, the relay R360 occupies its released or restored position so that a circuit including the conductors 303 and 304 and the contacts 364 is completed over which the relay R310 is energized. Accordingly, the relay R310 is operated to connect the input terminals of the constant current rectifier 20a to the commercial current supply source, and to connect the output terminals of this rectifier to the main bus conductors 12a and 13a, respectively. From the curve illustrated in Fig. 4 of the drawings, it will be noted that when the switch 303 is closed to supply current to the constant voltage rectifier 10a and the constant current rectifier 20a, current is delivered by these rectifiers in parallel to the load 40a alone or partially to this load and partially to the battery 30a, depending upon the magnitude of the load. Assuming that the load current demands are less than the combined output current ratings of the two rectifiers, a charging current is delivered to the battery 30a and the system voltage starts to rise. During this period, the relay R370 is normally energized over a circuit including the conductors 303 and 304 and is periodically deenergized by the pulsing element 375. Each time the relay R370 restores, it functions to connect the medium voltage test relay R330 across the main bus conductors 12a and 13a. When the system voltage, as measured across these conductors, reaches a value of approximately 49.5 volts, the medium voltage test relay R330 operates in a circuit which extends from the positive bus conductor 12a by way of the conductor 304, the contacts 372 and 363, the resistor 332, the winding of R330 and the conductor 303 to the negative bus conductor 13a. When energized over this circuit by a voltage of 49.5 volts, the relay R330 operates and closes its contacts 331 to complete an obvious circuit for energizing the slow-to-release control relay R340. The relay R340, in operating, prepares a locking circuit for itself which includes the contacts 341 and 371, and the conductors 303 and 304. This locking circuit is completed at the contacts 371 when the pulsing relay R370 next operates. In operating, the pulsing relay opens its contacts 372 to interrupt the circuit for energizing the medium voltage test relay R330. The relay R330 now restores to open its contacts 331 and thus interrupt the operating circuit for the relay R340. At its contacts 342, the relay R340 completes a circuit over which the high voltage test relay R350 is periodically connected across the main bus conductors 12a and 13a by the pulsing relay R370. At its contacts 343, the relay R340 completes an obvious circuit for energizing the control relay R320. The relay R320, in operating, opens its contacts 321, thereby to include the current limiting resistor 322 in the output circuit of the constant current rectifier 20a. In practice, the current limiting resistor 322 may form an integral part of the constant current rectifier 20a, but for convenience in describing the circuit this reresistor has been shown as a separate element. When the resistor 322 is included in the circuit traversed by the output current of the rectifier 20a, the magnitude of the current supplied by this rectifier is substantially reduced and, accordingly, the charging current supplied to the battery 30a in excess of the load current is reduced. The purpose of this arrangement is to reduce the charge of the battery 30a before the battery reaches a fully charged state, thus preventing excessive gassing and a false high voltage test before the battery reaches a fully charged condition.

Following the operation of the relay R320, the system voltage continues to rise, assuming that the load current is not materially increased. During this period of rising voltage, the relay R370 periodically connects the winding of the high voltage test relay across the bus conductors 12a and 13a in the manner explained above. Each time the relay R370 restores, it opens its contacts 371 to interrupt the locking circuit for the relay R370 and closes its contacts 372 to complete the circuit for energizing the medium voltage test relay R330. The relay R330 accordingly reoperates to complete the operating circuit for the slow-to-release relay R340 before the latter relay can restore. Obviously, the locking circuit for the relay R340 is recompleted and the operating circuit for the relay R330 is opened each time the pulsing relay R370 reoperates. Thus, the relay R340 is held operated and the test relay R330 only periodically operates so long as the system voltage is maintained at a value between 49.5 volts and 52 volts.

When the voltage across the conductors 12a and 13a reaches a value of approximately 52 volts, the medium and high voltage test relays R330 and R350 both operate, the circuit for energizing the relay R350 extending from the positive bus conductor 12a by way of the conductor 304, the contacts 372, the resistor 344, the contacts 342, the winding of R350 and the conductor 303 to the negative bus conductor 13a. In operating, the relay R350 closes its contacts 351 to complete an obvious circuit for energizing the slow-to-release control relay R360. The relay R360, upon operating, prepares a locking circuit for itself which includes the conductors 303 and 304 and the contacts 361 and 371. This circuit is completed at the contacts 371 when the pulsing relay R370 reoperates to terminate the test period. At its contacts 362, the relay R360 completes an obvious locking circuit for the high voltage test relay R350. At its contacts 363, the relay R360 opens the operating circuit for the medium voltage test relay R330. At its contacts 364, the relay R360 opens the operating circuit for the relay R310. Thus, the relays R310, R330 and R340 are caused to restore during the test period when the test relay R350 operates and before the pulsing relay R370 reoperates to terminate the period. The relay R340, upon restoring, opens its contacts 341 further to interrupt its locking circuit and opens its contacts 342 to interrupt the above-traced operating circuit for the high voltage test relay R350. The latter relay is, however, held energized over its locking circuit as traced above, until the pulsing relay R370 reoperates to terminate the test period. At its contacts 343, the relay R340 opens the operating circuit for the control relay R320. The relay R310, in releasing, opens its contacts 311 to interrupt the current supply circuit to the rectifier 20a, and opens its contacts 312 to interrupt the circuit over which direct current is supplied to the battery 30a and the load 40a from this rectifier. Thus the rectifier 20a is switched out of the current supply channel. The relay R320, in restoring, closes its contacts 321 to short-circuit the current limiting resistor 322, thereby to condition the constant current rectifier 20a to supply its full-rated current to the battery 30a and the load 40a when the switching relay R310 is subsequently energized.

Each time the pulsing relay R370 restores, it opens its contacts 371 to interrupt the locking circuit for the slow-to-release relay R360 and closes its contacts 372 to connect the relay R350 across the bus conductors 12a and 13a. So long as the system voltage remains at approximately 52 volts, the relay R350 reoperates each time it is thus energized. The relay R350, in operating, recompletes the operating circuit for the relay R360 before the latter relay can restore. Each time the pulsing relay R370 reoperates it recompletes the locking circuit for the relay R360 and opens the circuit for energizing the test relay R350. Thus, the test relay R350 only periodically operates and the relay R360 remains operated so long as the system voltage is maintained at approximately 52 volts.

Following the operations just described, the system voltage may drop because of an overload or because of a discharged condition of the battery 30a. When the voltage falls below 52 volts the high voltage test relay R350 is insufficiently energized to operate when the pulsing relay restores to complete the operating circuit therefor and to open the locking circuit for the relay R360. Accordingly the relay R360 is deenergized during the first test period when the test relay R350 fails to operate. The relay R360, upon restoring, opens its contacts 361 further to interrupt its locking circuit; opens its contacts 362 to interrupt the test circuit over which the high voltage test relay R350 is periodically energized; closes its contacts 363 to recomplete the test circuit over which the medium voltage test relay R330 is periodically energized, and closes its contacts 364 to recomplete the operating circuit for the switching relay R310. The relay R310 now reoperates to switch the constant current rectifier 20a into the current supply channel so that this rectifier delivers its full-rated output current to the load 40a and the battery 30a in parallel. From this point on the control network 50 operates in the manner just explained.

It will be apparent from the above explanation that the control network 50 is responsive to load changes and controls the constant current rectifier 20a accordingly. Thus, if the medium voltage test relay R330 and the control relays R340 and R320 are operated, and a heavy load is imposed upon the system, which tends rapidly to reduce the system voltage, the medium voltage test relay will fail to operate and the relay R340 will restore during the test period when the pulsing relay R370 next restores. In restoring, the relay R340 deenergizes relay R320, whereby the short circuit across the current limiting resistor 322 is established to increase the current supplied to the load 40a and the battery 30a from the constant current rectifier 20a. On the other hand, if a heavy load is removed from the current supply system, the medium voltage test relay R330, the relay R340, the high voltage test relay R350 and the relay R360 operate in sequence during the next succeeding test period when the pulsing relay R370 is released. The relay R360, upon operating, initiates the release of the four relays R310, R320, R330 and R340 in the manner explained above. Thus, the constant current rectifier 20a is automatically excluded from the current supply channel.

The purpose of providing the periodic testing arrangement described above is twofold. First, the periodic testing of the system voltage prevents the constant current rectifier 20a from being prematurely started in response to sudden and momentary load surges which cause a momentary drop in the system voltage at a time when the relay R310 is not operated. Similarly, there is less likelihood of the high voltage test relay R350 operating to cause the premature removal of the constant current rectifier 20a from the current supply channel in response to momentary decreases in the load imposed on the system. The second advantage of the periodic testing arrangement resides in the fact that the test relays R330 and R360 are not continuously subjected to voltage changes. Such continuous voltage changes tend to alter the characteristics of the test relays and, more specifically, to alter the voltage values at which these relays will operate and restore. With the arrangement illustrated, however, the test relays are not continuously subjected to the system voltage but are only energized for ten seconds out of every two minutes. Accordingly, the alteration in the characteristics thereof is substantially minimized.

As indicated above, the relay R300 is provided for the purpose of controlling an alarm circuit. This alarm circuit may be local to the exchange in which the illustrated current supply system is located, or may, in accordance with well known telephone engineering practice, be accessible to the automatic switching equipment of the exchange so that a distant supervising operator may, by dialing the directory number assigned to the alarm circuit, ascertain the condition of the system. In the latter case the alarm lead 305 may be utilized to control a tone relay which, in turn, controls a tone circuit over which a characteristic tone is transmitted to the calling supervisory operator when the tone circuit is seized through an automatic switch train. Arrangements of this character are well known in the art and, accordingly, the details thereof have not been illustrated in the drawings. It is sufficient to say that the alarm lead is included in the operating circuit for the tone relay, which relay sets the signaling circuits in accordance wtih the condition of the current supply system. With the arrangement illustrated, the circuit for energizing this tone relay is held open at the contacts 301, so long as current is being supplied from the commercial current source to one or both of the rectifiers 10a and 20a. If the commercial current source should fail or the current supplied to the rectifiers 10a and 20a should be inadvertently interrupted, the relay R300 restores and closes its contacts 301 to prepare the operating circuit for the tone relay associated with the alarm lead 305. This circuit is not completed so long as the relay R360 is maintained in its operated position indicating that the voltage of the battery 30a is above normal. If, however, the relay R360 is deenergized, the circuit for energizing the tone relay is completed in response to the release of the relay R300. More specifically, the positive bus conductor 12a is connected to the alarm lead 305 over the circuit including the conductor 304 and the contacts 365 and 301. When this connection is completed, the relay terminating the alarm lead 305 is energized and operates either to produce an alarm in the exchange where the current supply system is located, or to condition the associated signaling circuits for the transmission of an alarm signal to a supervisory operator. The relay controlled over the alarm lead 305 may also be utilized automatically to transmit an alarm to a distant alarm center when the alternating current feeder circuit is opened, all in a manner well understood in the art. Obviously, the alarm circuit, including the lead 305, is interrupted when the current supply circuit to the two rectifiers 10a and 20a is recompleted.

While there have been described what are at present considered to be the preferred embodiments of the invention, it will be understood that various modifications may be made therein, and it is contemplated to cover in the appended claims all such modifications as fall within the true spirit and scope of the invention.

What is claimed is:

1. In a system for supplying direct current to a load from an alternating current source, a first rectifier operative to deliver current to said load at a substantially constant voltage, a normally inactive second rectifier operative to deliver a substantially constant current to said load, and load current responsive means for automatically rendering said second rectifier operative to deliver current to said load when the load current rises to a predetermined value.

2. In a system for supplying direct current to a load from an alternating current source, a rectifier normally operative to deliver current to said load at a substantially constant voltage, a normally inactive rectifier operative to deliver current of substantially constant magnitude to said load, and load current responsive means for connecting said rectifiers in parallel when the load current rises to a predetermined value.

3. In a system for supplying direct current to a load from an alternating current source, a first rectifier operative to deliver current to the load at a substantially constant voltage regardless of the magnitude of the load current, a second rectifier operative to deliver current of a substantially constant predetermined value to the load regardless of the load resistance, means for delivering current to the load only from said first rectifier as long as the load current does not exceed said predetermined value, and load current responsive means for delivering current to the load from both of said rectifiers when the load current exceeds said predetermined value.

4. In a system for supplying direct current to a load from an alternating current source, a rectifier operative to deliver current to the load at a substantially constant voltage regardless of the load, a second rectifier operative to deliver current of a substantially constant predetermined value to the load regardless of the load resistance, and load current responsive means connecting said rectifiers to operate in parallel as long as the load current exceeds said predetermined value and operative to cut out said second rectifier when the load current falls below said predetermined value.

5. In a system for supplying direct current to a load and for charging a battery connected to the load, a source of alternating current, means including a pair of parallel connected rectifiers for converting the current of said source into direct current and for delivering the direct current to the load, testing means controlled in accordance with the voltage across said battery, means for intermittently connecting said testing means to said battery, and means controlled by said testing means for cutting out one of said rectifiers in response to a rise in the voltage across said battery to a predetermined value.

6. In a system for supplying direct current to a load and for charging a battery connected to the load, a source of alternating current, means including a pair of parallel connected rectifiers for converting the current of said source into direct current and for delivering the direct current to the load, testing means controlled in accordance with the voltage across said battery and having a medium voltage setting and a high voltage setting, means controlled by said testing means for descreasing the current delivered to said load by said rectifiers in response to operation of said testing means to its medium voltage setting, and means controlled by said testing means for cutting out one of said rectifiers in response to operation of said testing means to its high voltage setting.

7. In a system for supplying direct current to a load and for charging a battery connected to the load, a source of alternating current, means including a pair of parallel connected rectifiers for converting the current of said source into direct current and for delivering the direct current to the load, testing means controlled in accordance with the voltage across said battery and having a medium voltage setting and a high voltage setting, means for intermittently connecting said testing means to said battery, means controlled by said testing means for decreasing the current delivered to said load by said rectifiers in response to operation of said testing means to its medium voltage setting, and means controlled by said testing means for cutting out one of said rectifiers in response to operation of said testing means to its high voltage setting.

8. In a system for supplying direct current to a load and for charging a battery connected to the load, a source of alternating current, a pair of rectifiers each operative to convert the current of said source into direct current and to deliver the direct current to the load, means connecting one of said rectifiers to deliver current to the load, testing means controlled in accordance with the voltage across said battery, means for intermittently connecting said testing means to said battery, and means controlled by said testing means for connecting the other of said rectifiers to deliver current to the load when the voltage across said battery falls to a predetermined value.

9. In a system for supplying direct current to a load and for charging a battery connected to the load, a source of alternating current, a pair of rectifiers each operative to convert the current of said source into direct current and to deliver the direct current to the load, means connecting one of said rectifiers to deliver current to the load, testing means controlled in accordance with the voltage across said battery and having a low voltage setting and a medium voltage setting, means controlled by said testing means for connecting the other of said rectifiers to deliver current to the load when said testing means acquires its low voltage setting, and means controlled by said testing means for reducing the current delivered to the load by said rectifiers when said testing means acquires its medium voltage setting.

10. In a system for supplying direct current to a load and for charging a battery connected to the load, a source of alternating current, a pair of rectifiers each operative to convert the current of said source into direct current and to deliver the direct current to the load, means connecting one of said rectifiers to deliver current to the load, testing means controlled in accordance with the voltage across said battery and having a low voltage setting and a medium voltage setting, means for intermittently connecting said testing means to said battery, means controlled by said testing means for connecting the other of said rectifiers to deliver current to the load when said testing means acquires its low voltage setting, and means controlled by said testing means for reducing the current delivered to the load by said other rectifier when said testing means acquires its medium voltage setting.

11. In a system for supplying direct current to a load and for charging a battery connected to the load, a source of alternating current, a pair of rectifiers each operative to convert the current of said source into direct current and to deliver the direct current to the load, means connecting one of said rectifiers to deliver current to the load, testing means controlled in accordance with the voltage across said battery and having low, medium and high voltage settings, means controlled by said testing means for connecting the other of said rectifiers to deliver current to the load in response to operation of said testing means to its low voltage setting, means controlled by said testing means for reducing the current delivered to the load by said rectifiers in response to operation of said testing means to its medium voltage setting, and means controlled by said testing means for cutting out said other rectifier in response to operation of said testing means to its high voltage setting.

12. In a system for supplying direct current to a load and for charging a battery connected to the load, a source of alternating current, a pair of rectifiers each operative to convert the current of said source into direct current and to deliver the direct current to the load, means connecting one of said rectifiers to deliver current to the load, testing means controlled in accordance with the voltage across said battery and having low, medium and high voltage settings, means for intermittently connecting said testing means to said battery, means controlled by said testing means for connecting the other of said rectifiers to deliver current to the load in response to operation of said testing means to its low voltage setting, means controlled by said testing means for reducing the current delivered to the load by said rectifiers in response to operation of said testing means to its medium voltage setting, and means controlled by said testing means for cutting out said other rectifier in response to operation of said testing means to its high voltage setting.

13. In a system for supplying direct current to a load and for charging a battery connected to the load, a source of alternating current, a pair of rectifiers each operative to convert the current of said source into direct current and to deliver the direct current to the load, means connecting one of said rectifiers to deliver current to the load, testing means controlled in accordance with the voltage across said battery and having low and high voltage settings, means controlled by said testing means for connecting the other of said rectifiers to deliver current to the load in response to operation of said testing means to its low voltage setting, and means controlled by said testing means for cutting out said other rectifier in response to operation of said testing means to its high voltage setting.

14. In a system for supplying direct current to a load and for charging a battery connected to the load, a source of alternating current, a pair of rectifiers each operative to convert the current of said source into direct current and to deliver the direct current to the load, means connecting one of said rectifiers to deliver current to the load, testing means controlled in accordance with the voltage across said battery and having low and high voltage settings, means for intermittently connecting said testing means to said battery, means controlled by said testing means for connecting the other of said rectifiers to deliver current to the load in response to operation of said testing means to its low voltage setting, and means controlled by said testing means for cutting out said other rectifier in response to operation of said testing means to its high voltage setting.

15. In a system for supplying direct current to a load and for charging a battery connected to said load, a source of alternating current, a first rectifier connected to convert the current of said source into direct current and to deliver the direct current to the load at a substantially constant voltage regardless of the magnitude of the load, a second rectifier operative to convert the current of said source into direct current and to deliver direct current of substantially constant magnitude to the load regardless of the load resistance, and voltage responsive means for connecting said second rectifier to deliver current to the load and battery when the voltage across said battery assumes a predetermined value.

16. In a system for supplying direct current to a load and for charging a battery connected to said load, a source of alternating current, a first rectifier connected to convert the current of said source into direct current and to deliver the direct current to the load at a substantially constant voltage regardless of the magnitude of the load, a second rectifier operative to convert the current of said source into direct current and to deliver direct current of substantially constant magnitude to the load regardless of the load resistance, means for connecting said second rectifier to deliver current to the load when the voltage across said battery assumes a predetermined value, and means for decreasing the current delivered to the load by said rectifiers when the voltage across the battery rises to a higher predetermined value.

17. In a system for supplying direct current to a load and for charging a battery connected to said load, a source of alternating current, a first rectifier connected to convert the current of said source into direct current and to deliver the direct current to the load at a substantially constant voltage regardless of the magnitude of the load, a second rectifier operative to convert the current of said source into direct current and to deliver direct current of substantially constant magnitude to the load regardless of the load resistance, voltage responsive means for connecting said second rectifier to deliver current to the load when the voltage across said battery assumes a predetermined value, and voltage responsive means for cutting out said second rectifier when the voltage across the battery rises to a higher predetermined value.

18. In a system for supplying direct current to a load and for charging a battery connected to the load, a source of alternating current, a first rectifier connected to convert the current of said source into direct current and to deliver the direct current to the load at a substantially constant voltage regardless of the magnitude of the load, a second rectifier operative to convert the current of said source into direct current and to deliver direct current of substantially constant magnitude to the load regardless of the load resistance, voltage responsive means for connecting said second rectifier to deliver current to the load when the voltage across said battery assumes a predetermined value, voltage responsive means for decreasing the current delivered to the load by said rectifiers when the voltage across the battery rises to a higher predetermined value, and voltage responsive means for cutting out said second rectifier when the voltage across the battery rises to a still higher predetermined value.

19. In a system for charging a battery, voltage responsive testing means operative to test the voltage of said battery, means for intermittently connecting said testing means to said battery for periods which are substantially less than the periods when the testing means is disconnected from said battery, means controlled by said testing means for delivering a charging current to said battery when the voltage of said battery falls to a predetermined value, means controlled by said testing means for reducing the charging rate when the voltage of said battery attains a predetermined higher value, and means for substantially terminating the charge when the voltage of said battery rises from said predetermined higher value to a still higher predetermined value.

20. In a system for supplying current to a load and for charging a battery connected to supply current to the load, testing means operative to test the voltage of said battery, means for intermittently connecting said testing means to said battery for periods which are substantially less than the periods when the testing means is disconnected from said battery, means controlled by said testing means for delivering current to the load when the load current is increased to a predetermined value and for delivering a charging current to said battery when the voltage of said battery falls to a predetermined value, means controlled by said testing means for reducing the charging rate when the voltage of said battery attains a predetermined higher value, and means for substantially terminating the charge when the voltage of said battery rises to a still higher predetermined value.

21. In a system for charging a battery, a charging circuit, means for periodically testing the voltage of said battery for test intervals which are substantially less than the non-test intervals, means controlled by said testing means for completing said circuit when the voltage of said battery falls to a predetermined value, means controlled by said testing means for reducing the charging rate when the voltage of said battery rises to a predetermined higher value, and means controlled by said testing means for opening said circuit when the voltage of said battery rises to a second and still higher predetermined value.

22. In a system for charging a battery, a voltage test circuit comprising medium and high voltage test relays, means for intermittently impressing the voltage of the battery upon said medium voltage test relay so long as the voltage of the battery is below a predetermined medium value and for intermittently impressing the voltage of the battery upon said high voltage test relay when the voltage of the battery rises above said predetermined medium value, means for delivering charging current to the battery, means controlled by said medium voltage test relay for reducing the charging rate when the voltage of the battery rises to said predetermined medium value, and means controlled by said high voltage test relay for substantially terminating the charge when the voltage of the battery rises to a higher predetermined value.

WILLIAM H. PERKINS.